(12) United States Patent
Harada et al.

(10) Patent No.: US 8,442,027 B2
(45) Date of Patent: May 14, 2013

(54) MOBILE STATION, RADIO BASE STATION AND SYNCHRONIZATION ESTABLISHING METHOD

(75) Inventors: Atsushi Harada, Kawasaki (JP); Anil Umesh, Yokohama (JP); Minami Ishii, Yokohama (JP)

(73) Assignee: NTT DoCoMo, Inc, Tokyo (JP)

( * ) Notice: Subject to any disclaimer, the term of this patent is extended or adjusted under 35 U.S.C. 154(b) by 280 days.

(21) Appl. No.: 12/532,447

(22) PCT Filed: Mar. 21, 2008

(86) PCT No.: PCT/JP2008/055333
§ 371 (c)(1),
(2), (4) Date: Nov. 16, 2009

(87) PCT Pub. No.: WO2008/123161
PCT Pub. Date: Oct. 16, 2008

(65) Prior Publication Data
US 2010/0085929 A1    Apr. 8, 2010

(30) Foreign Application Priority Data
Mar. 23, 2007    (JP) ............................... P2007-077980

(51) Int. Cl.
*H04J 3/06*    (2006.01)
*H04W 4/00*    (2009.01)
*H04L 12/28*    (2006.01)

(52) U.S. Cl.
USPC ........................................................ 370/350

(58) Field of Classification Search ........................ None
See application file for complete search history.

(56) References Cited

U.S. PATENT DOCUMENTS

| 8,054,758 | B2* | 11/2011 | Chun et al. ..................... 370/252 |
| 2001/0008524 | A1* | 7/2001 | Ishii et al. ..................... 370/335 |
| 2001/0036168 | A1 | 11/2001 | Terry |
| 2005/0124344 | A1* | 6/2005 | Laroia et al. ................... 455/436 |
| 2007/0230394 | A1* | 10/2007 | Wang et al. ..................... 370/328 |
| 2007/0259675 | A1* | 11/2007 | Worrall ......................... 455/458 |
| 2008/0101306 | A1* | 5/2008 | Bertrand et al. .............. 370/336 |
| 2012/0147821 | A1* | 6/2012 | Bertrand et al. .............. 370/328 |

FOREIGN PATENT DOCUMENTS

| JP | 10-145329 A | 5/1998 |
| JP | 2003-530760 A | 10/2003 |
| JP | 2006-67099 A | 3/2006 |

OTHER PUBLICATIONS

International Search Report w/translation from PCT/JP2008/055333 dated Jul. 1, 2008 (4 pages).
Written Opinion from PCT/JP2008/055333 dated Jul. 1, 2008 (5 pages).
Patent Abstracts of Japan; Publication No. 10-145329 dated May 29, 1998; Hitachi Ltd. (1 page).
Patent Abstracts of Japan; Publication No. 2006-067099 dated Mar. 9, 2006; Fujitsu Ltd. (1 page).

(Continued)

*Primary Examiner* — Kevin C Harper
*Assistant Examiner* — Samina Choudhry
(74) *Attorney, Agent, or Firm* — Osha Liang LLP (57) ABSTRACT

A mobile station (UE) is configured to establish uplink synchronization with a radio base station (eNB). The mobile station (UE) is configured not to return transmission acknowledgment information for downlink data until receiving a command for adjusting uplink transmission timing, when the radio base station (eNB) allocates a radio resource for transmission of the downlink data to the mobile station (UE).

6 Claims, 11 Drawing Sheets

OTHER PUBLICATIONS

3GPP TSG RAN WG2 #57, R2-070781; "Uplink Synchronization", NTT DoCoMo, Inc.; St. Louis, USA, Feb. 12-16, 2007 (3 pages).
Office Action for Chinese Patent Application No. 200880009554.0, issued Apr. 1, 2012, with English translation thereof (8 pages).
Office Action for Japanese Patent Application No. 2007-077980 mailed May 8, 2012, with English translation thereof (5 pages).

* cited by examiner

MOBILE STATION, RADIO BASE STATION AND SYNCHRONIZATION ESTABLISHING METHOD

TECHNICAL FIELD

The present invention relates to a synchronization establishing method, a mobile station and a radio base station for establishing uplink synchronization.

BACKGROUND ART

In recent years, there has been known a technique by which a mobile station UE performs "discontinuous reception" of downlink data, in order to save its own battery, in a radio access scheme such as "LTE (long term evolution)", the 3GPP standardization of which is underway.

In this radio access scheme, it is not always necessary to maintain uplink synchronization between the mobile station UE in a discontinuous reception state and a radio base station eNB.

Figure 1:
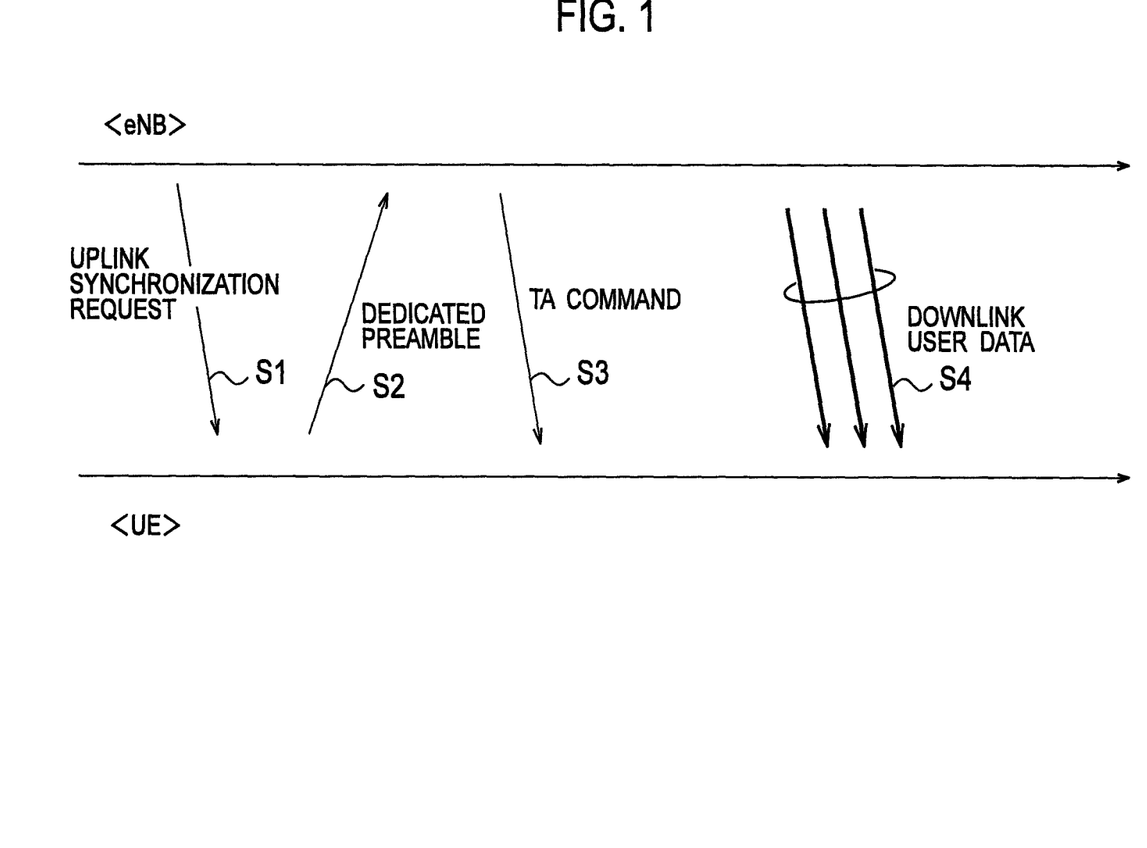
FIG. 1 is a view for explaining a procedure to restart from a DRX state in a mobile communication system according to a conventional technique.

Accordingly, this radio access scheme is configured to establish uplink synchronization between the radio base station eNB and the mobile station UE, as shown in FIG. 1, when downlink user data for the mobile station UE in the discontinuous reception state occurs and when uplink synchronization is not maintained between the mobile station and the radio base station eNB.

To be more precise, as shown in FIG. 1, in Step S1, the radio base station eNB transmits "UL synch request (an uplink synchronization request)" to the mobile station UE, in order to establish uplink synchronization between the radio base station eNB and the mobile station UE.

In Step S2, using an asynchronous RACH (random access channel), the mobile station UE transmits a dedicated preamble designated by the above-mentioned "UL synch request".

Here, the dedicated preamble means a data series which is individually allocated to each mobile station and used for identifying the mobile station. Note that the "UL synch request" does not include the dedicated preamble itself but includes an identifier for identifying the dedicated preamble.

In Step S3, in response to the dedicated preamble transmitted from the mobile station UE, the radio base station eNB creates a TA (Timing Advance) command for adjusting uplink transmission timing for the mobile station UE, and transmits the TA command to the mobile station UE.

Thereafter, in Step S4, the radio base station eNB transmits the above-described downlink user data to the mobile station UE by using a DL-SCH (downlink shared data channel: Downlink-Shared Channel).

Non-patent Document 1: 3GPP TSG RAN WG2 #57, R2-070781

DISCLOSURE OF THE INVENTION

However, the conventional radio access scheme has the following problem in the procedure to restart transmission of downlink user data by shifting the reception state of the mobile station UE from a DRX state (the discontinuous reception state) to a continuous reception state as described above. Specifically, in the process, in response to downlink data (such as downlink user data) transmitted from the radio base station eNB, the mobile station UE may transmit transmission acknowledgment information (ACK/NACK) in a HARQ (Hybrid Automatic Repeat Request) process before establishing uplink synchronization with the radio base station eNB. In this case, uplink interference occurs due to the transmission acknowledgment information.

An example of a situation where such a problem occurs will be described with reference to FIG. 2.

Figure 2:
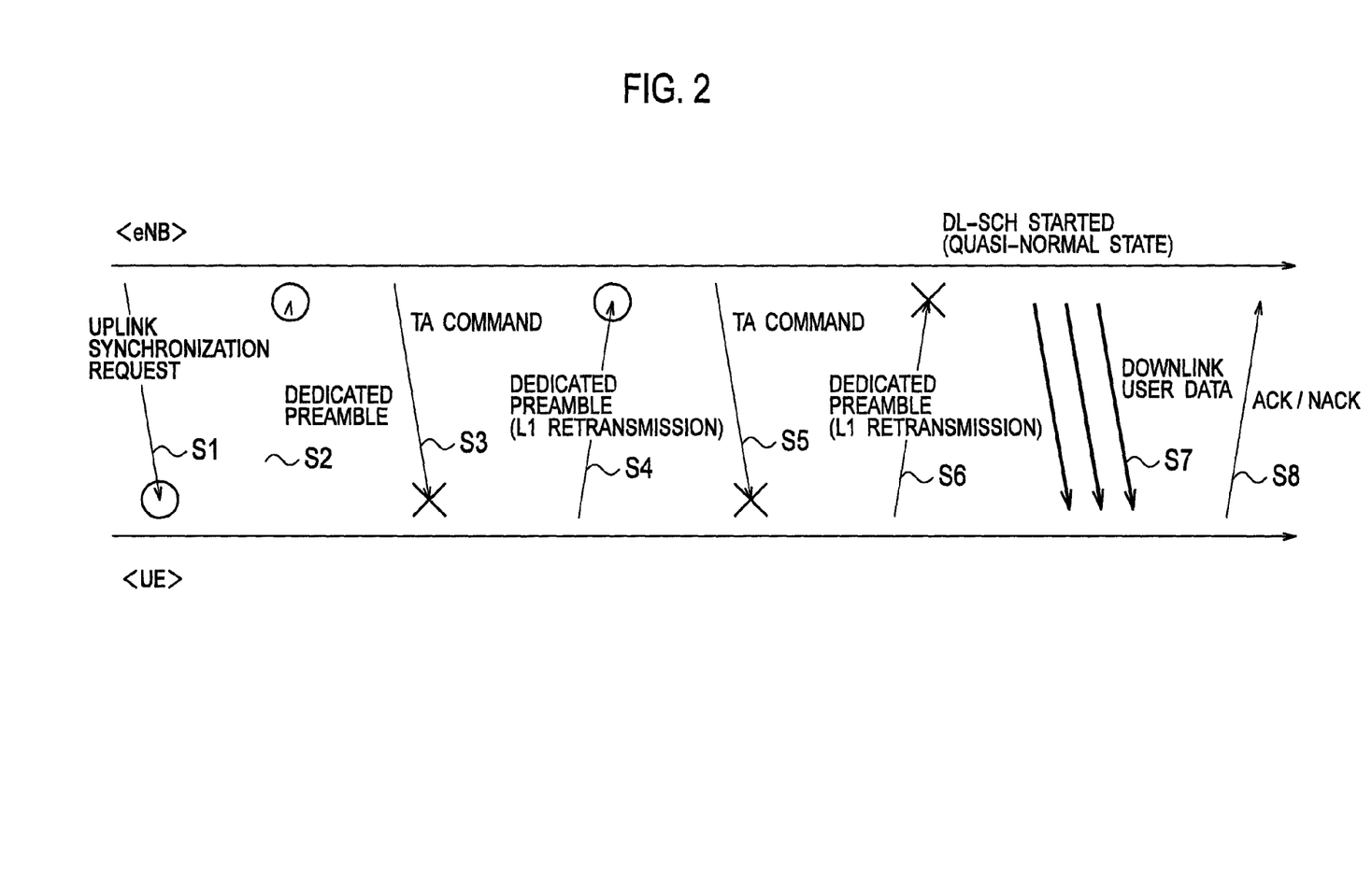
FIG. 2 is a view for explaining a problem of the procedure to restart from the DRX state in the mobile communication system according to the conventional technique.

As shown in FIG. 2, in Step S1, the radio base station eNB transmits "UL synch request (uplink synchronization request)" to the mobile station UE.

In Step S2, the mobile station UE transmits a dedicated preamble designated by the above-described "UL synch request" by using an asynchronous RACH (random access channel).

In Step S3, the radio base station eNB creates a TA command in response to the dedicated preamble transmitted by the mobile station UE, and transmits the TA command to the mobile station UE.

However, the mobile station UE fails to receive the TA command and therefore retransmits the above-described dedicated preamble by using the asynchronous RACH in Step S4.

In Step S5, the radio base station eNB creates a TA command in response to the dedicated preamble retransmitted by the mobile station UE, and transmits the command to the mobile station UE.

In Step S6, the mobile station UE fails to receive the TA command again, and therefore retransmits the above-described dedicated preamble by using the asynchronous RACH.

On this occasion, however, the radio base station eNB fails to receive the dedicated preamble retransmitted by the mobile station UE this time. Accordingly, the radio base station eNB starts transmission of the above-mentioned downlink user data by using the DL-SCH in Step S7 although uplink synchronization is not established.

Then, in Step S8, the mobile station UE returns transmission acknowledgment information (ACK/NACK) for the downlink data. Such transmission acknowledgment information causes the uplink interference.

Therefore, the present invention has been made in view of the above-described problem. An object of the present invention is to provide a mobile station, a radio base station and a synchronization establishing method, which are capable of preventing occurrence of uplink interference due to transmission acknowledgment information in the HARQ process in establishment of uplink synchronization.

A first aspect of the present invention is summarized as a mobile station configured to establish uplink synchronization, wherein the mobile station is configured not to return transmission acknowledgment information for downlink data until receiving a command for adjusting uplink transmission timing, when a radio base station allocates a radio resource for transmission of the downlink data to the mobile station.

In the first aspect, the radio resource can be allocated by use of an identifier which individually identifies the mobile station within a cell.

In the first aspect, the transmission acknowledgment information can be any of ACK and NACK in a HARQ process.

A second aspect of the present invention is summarized as a radio base station which is used in a mobile communication system and which is configured to establish uplink synchronization with a mobile station, the radio base station including: an uplink synchronization request transmitter unit configured to transmit an uplink synchronization request designating a data series which is allocated to the mobile station and which is used for identifying the mobile station; and a command transmitter unit configured to determine that the mobile station has successfully received the uplink synchronization request, and to transmit a command for adjusting uplink transmission timing to the mobile station, when the data series is received from the mobile station.

In the second aspect, the data series can be a preamble for a random access channel.

A third aspect of the present invention is summarized as a synchronization establishing method of establishing uplink synchronization between a radio base station and a mobile station, the synchronization establishing method including the steps of: allocating, at the radio base station, a radio resource for transmission of a downlink data to the mobile station; transmitting, at the radio base station, an uplink synchronization request designating a data series which is allocated to the mobile station and which is used for identifying the mobile station; notifying, from the mobile station to the radio base station, the data series designated by the uplink synchronization request, when successfully receiving the uplink synchronization request; and determining, at the radio base station, that the mobile station has successfully received the uplink synchronization request, and transmitting, from the radio base station to the mobile station, a command for adjusting uplink transmission timing, when the radio base station receives the data series from the mobile station.

In the third aspect, the mobile station does not have to return transmission acknowledgment information for the downlink data until receiving the command after the radio base station allocates the radio resource for transmission of the downlink data to the mobile station.

In the third aspect, the data series can be a preamble for a random access channel; and when successfully receiving the uplink synchronization request, the mobile station can notify, to the radio base station, the preamble designated by the uplink synchronization request by use of the random access channel.

As described above, the present invention can provide a mobile station, a radio base station and a synchronization establishing method, which are capable of preventing occurrence of uplink interference due to transmission acknowledgment information in the HARQ process in establishment of uplink synchronization.

BEST MODE FOR CARRYING OUT THE INVENTION

Configuration of Mobile Communication System According to First Embodiment of the Present Invention A configuration of a mobile communication system according to a first embodiment of the present invention will be described with reference to FIG. 3. In this embodiment, a mobile communication system applying a radio access system defined by the LTE will be described as an example. However, the present invention is not limited to such mobile communication system and is also applicable to mobile communication systems applying other radio access systems.

Figure 3:
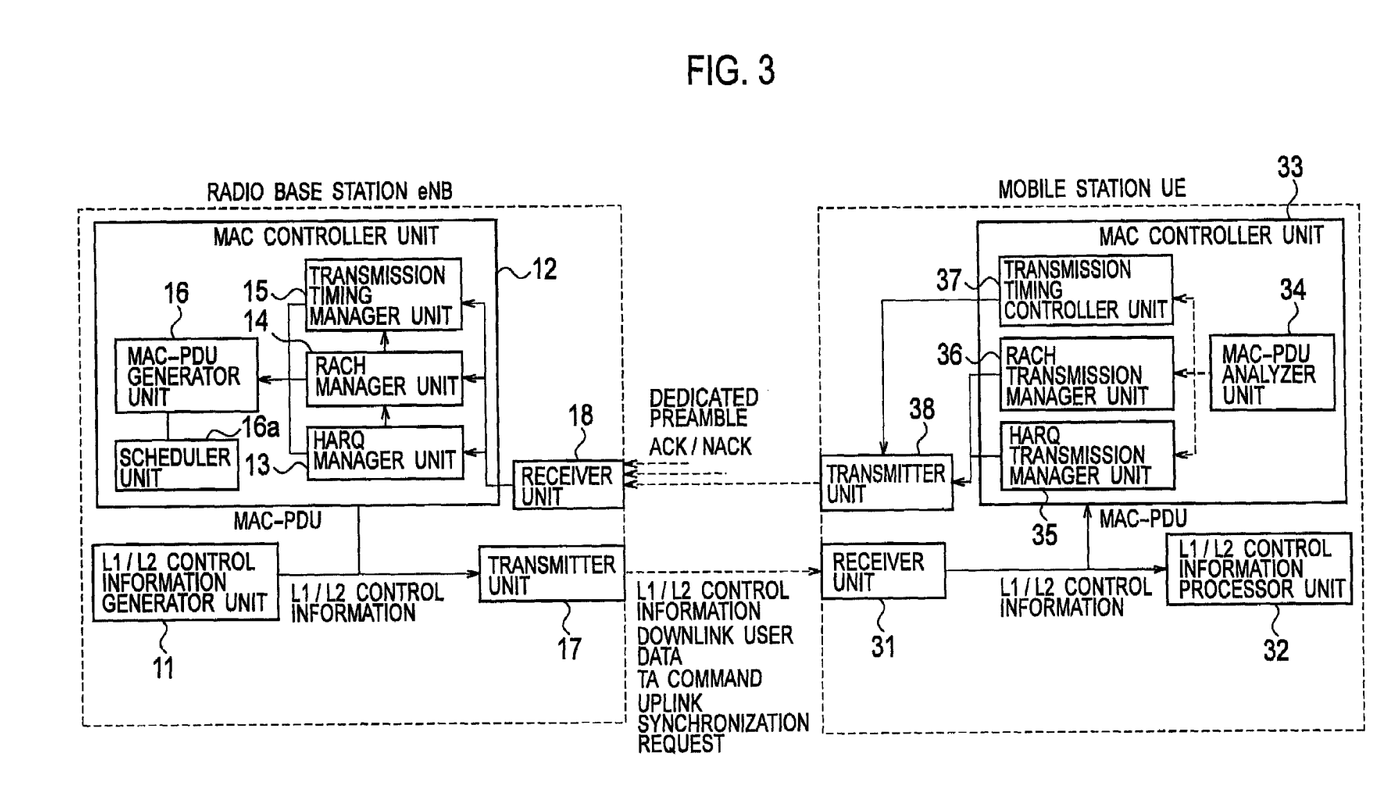
FIG. 3 is a functional block diagram of a radio base station and a mobile station according to a first embodiment of the present invention.

As shown in FIG. 3, the mobile communication system according to this embodiment includes a radio base station eNB and a mobile station UE. Moreover, in this embodiment, a description will be given of an example in which the mobile communication system is configured to establish uplink synchronization when a reception state of the mobile station UE transitions from a DRX state (a discontinuous reception state) to a continuous reception state. However, the present invention is not limited to this case and is also applicable to other examples in which the mobile communication system is configured to establish uplink synchronization.

The radio base station eNB includes an L1/L2 control information generator unit 11, a MAC controller unit 12, a transmitter unit 17, and a receiver unit 18.

The L1/L2 control information generator unit 11 is configured to generate L1/L2 control information.

The L1/L2 control information includes, for example, radio resource notification control information for notifying of a radio resource for transmission of downlink data allocated to the mobile station UE.

The radio resource notification control information does not include a common identifier (RA-RNTI: Random Access-Radio Network Temporary Identifier) that is allocated to a response to a random access, but includes an identifier (C-RNTI: Cell-Radio Network Temporary Identifier) for individually identifying the mobile station UE within a cell. In other words, in this embodiment, the above-described allocation of the radio resource is executed by use of the C-RNTI instead of the RA-RNTI.

Moreover, in this embodiment, downlink data is assumed to correspond to a MAC-PDU and to include downlink user data to be transmitted by DCCH, DTCH or the like, a TA command, an uplink synchronization request, and so forth.

The MAC controller unit 12 includes a HARQ manager unit 13, a RACH manager unit 14, a transmission timing manager unit 15, a MAC-PDU generator unit 16, and a scheduler unit 16*a*.

The HARQ manager unit 13 is configured to perform retransmission control based on transmission acknowledgment information (ACK/NACK) of a HARQ process.

The RACH manager unit 14 is configured to allocate a dedicated preamble (a data series which is individually allocated to each mobile station UE) to be transmitted by an asynchronous RACH, to the mobile station UE. Moreover, the RACH manager unit 14 is configured to identify the dedicated preamble included in the asynchronous RACH transmitted from the mobile station UE.

The transmission timing manager unit 15 is configured to determine that the mobile station UE has successfully received an uplink synchronization request, when the dedicated preamble is received from the mobile station UE after the transmitter unit 17 transmits the uplink synchronization request, and to create a TA command for adjusting uplink transmission timing in response to reception timing of the dedicated preamble notified by the mobile station UE.

Here, the uplink transmission timing includes transmission timing in an uplink control channel and in an uplink data channel.

The MAC-PDU generator unit 16 is configured to generate a MAC-PDU (downlink data) in a radio subframe to which a transmission opportunity is allocated by the scheduler unit 16*a*, in response to instructions and the like from the HARQ manager unit 13, the RACH manager unit 14, and the transmission timing manager unit 15.

To be more precise, the MAC-PDU generator unit 16 is configured to generate a MAC-PDU including downlink user data to be retransmitted in response to a retransmission control instruction from the HARQ manager unit 13.

Moreover, the MAC-PDU generator unit 16 is configured to generate a MAC-PDU including an uplink synchronization request that designates the dedicated preamble for the mobile station UE allocated by the RACH manager unit 14.

Here, the uplink synchronization request may be configured to designate the dedicated preamble for the mobile station UE by containing the dedicated preamble for the mobile station UE itself or to designate the dedicated preamble for the mobile station UE by containing an identifier for identifying the dedicated preamble for the mobile station UE instead of containing the dedicated preamble for the mobile station UE itself.

In addition, the MAC-PDU generator unit 16 is configured to generate a MAC-PDU containing the TA command that is created by the transmission timing manager unit 15.

The transmitter unit 17 is configured to transmit L1/L2 control information by using an L1/L2 control channel (such as a PDCCH: Physical Downlink Control Channel), and to transmit a MAC-PDU including downlink user data, an uplink synchronization request, a TA command, and so forth by using a downlink data channel (such as a DL-SCH).

The receiver unit 18 is configured to receive the dedicated preamble for the mobile station UE via an asynchronous RACH, and to receive transmission acknowledgment information in the HARQ process via an uplink channel (such as a PUCCH: Physical Uplink Control Channel or a PUSCH: Physical Uplink Shared Channel).

The mobile station UE includes a receiver unit 31, a L1/L2 control information processor unit 32, a MAC controller unit 33, and a transmitter unit 38. Here, the L1/L2 control information processor unit 32 and the MAC controller unit 33 may be implemented by a chip that is mounted on the mobile station UE.

The receiver unit 31 is configured to receive L1/L2 control information via the L1/L2 control channel, and to receive a MAC-PDU containing downlink user data, an uplink synchronization request, a TA command, and the like by using the downlink data channel.

The L1/L2 control information processor unit 32 is configured to perform predetermined L1/L2 control processing in accordance with the received L1/L2 control information.

The MAC controller unit 33 includes a MAC-PDU analyzer unit 34, a HARQ transmission manager unit 35, a RACH transmission manager unit 36, and a transmission timing controller unit 37.

The MAC-PDU analyzer unit 34 is configured to analyze the received MAC-PDU.

The HARQ transmission manager unit 35 is configured to manage transmission of transmission acknowledgment information (ACK/NACK) in the HARQ process in accordance with an analysis result of the MAC-PDU by the MAC-PDU analyzer unit 34.

To be more precise, when the radio base station eNB allocates a radio resource for downlink data (MAC-PDU) transmission by using the C-RNTI instead of the RA-RNTI, the HARQ transmission manager unit 35 is configured to instruct the transmitter unit 38 not to return transmission acknowledgment information (ACK/NACK in the HARQ process) for the downlink data until a TA command for adjusting uplink transmission timing is received.

Here, the HARQ transmission manager unit 35 may, but does not necessarily have to, transmit the transmission acknowledgment information in the HARQ process to the MAC-PDU containing the TA command.

The RACH transmission manager unit 36 is configured to manage transmission of the asynchronous RACH in accordance with the analysis result of the MAC-PDU by the MAC-PDU analyzer unit 34.

To be more precise, when an uplink synchronization request from the radio base station eNB is received, the RACH transmission manager unit 36 is configured to instruct the transmitter unit 38 to transmit the dedicated preamble designated by the uplink synchronization request by using the synchronous RACH.

Moreover, when a TA command from the radio base station eNB is not received for a predetermined period, the RACH transmission manager unit 36 is configured to instruct the transmitter unit 38 to transmit the dedicated preamble designated by the uplink synchronization request again by using the asynchronous RACH.

Further, when downlink data from the radio base station eNB is received before establishment of uplink synchronization, the RACH transmission manager unit 36 is configured to instruct the transmitter unit 38 to transmit the dedicated preamble designated by the uplink synchronization request by using the asynchronous RACH.

The transmission timing controller unit 37 is configured to control uplink transmission timing in accordance with the analysis result of the MAC-PDU by the MAC-PDU analyzer unit 34.

To be more precise, the transmission timing controller unit 37 is configured to establish uplink synchronization by controlling the uplink transmission timing in accordance with the TA command and the like transmitted by the radio base station eNB.

The transmitter unit 38 is configured to transmit the dedicated preamble for the mobile station UE via the asynchronous RACH in response to instructions from the HARQ transmission manager unit 35, the RACH transmission manager unit 36, and the transmission timing controller unit 37, and to transmit the transmission acknowledgment information (ACK/NACK) in the HARQ process via the uplink channel (such as the PUCCH or the PUSCH).

(Operations of Mobile Communication System According to First Embodiment of the Present Invention)

Operations of the mobile communication system according to the first embodiment of the present invention will be described with reference to FIG. 4 to FIG. 13.

First, operations of the radio base station eNB according to this embodiment will be described with reference to FIG. 4 to FIG. 9.

Figure 4:
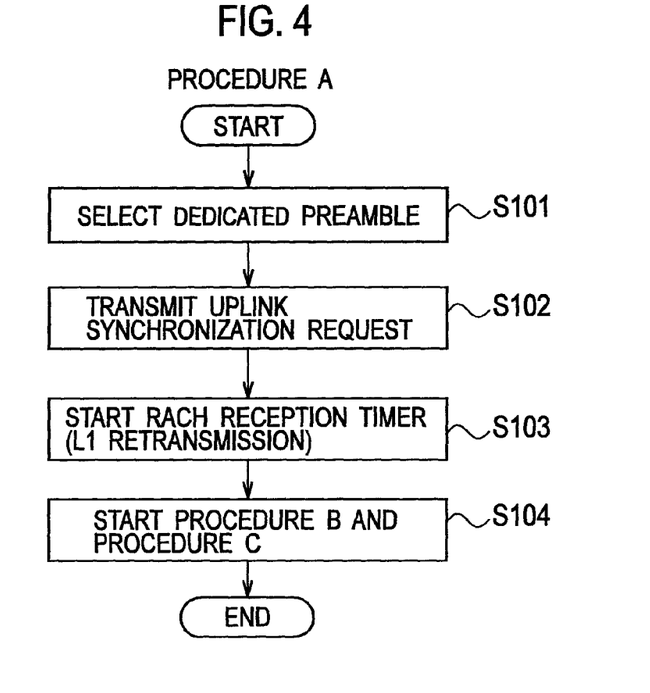
FIG. 4 is a flowchart showing operations in a procedure A by the radio base station according to the first embodiment of the present invention.

As shown in FIG. 4, when the radio base station eNB starts a procedure A, the RACH manager unit 14 selects a dedicated preamble for the mobile station UE from a group of stored preambles in Step S101.

In Step S102, the MAC-PDU generator unit 16 generates a MAC-PDU containing an uplink synchronization request that designates the dedicated preamble for the mobile station UE, and the transmitter unit 17 transmits the MAC-PDU to the mobile station UE by using the DL-DCH.

In Step S103, the RACH manager unit 14 starts a RACH reception timer (L1 retransmission). In Step S104, the radio base station eNB starts a procedure B and a procedure C.

Figure 5:
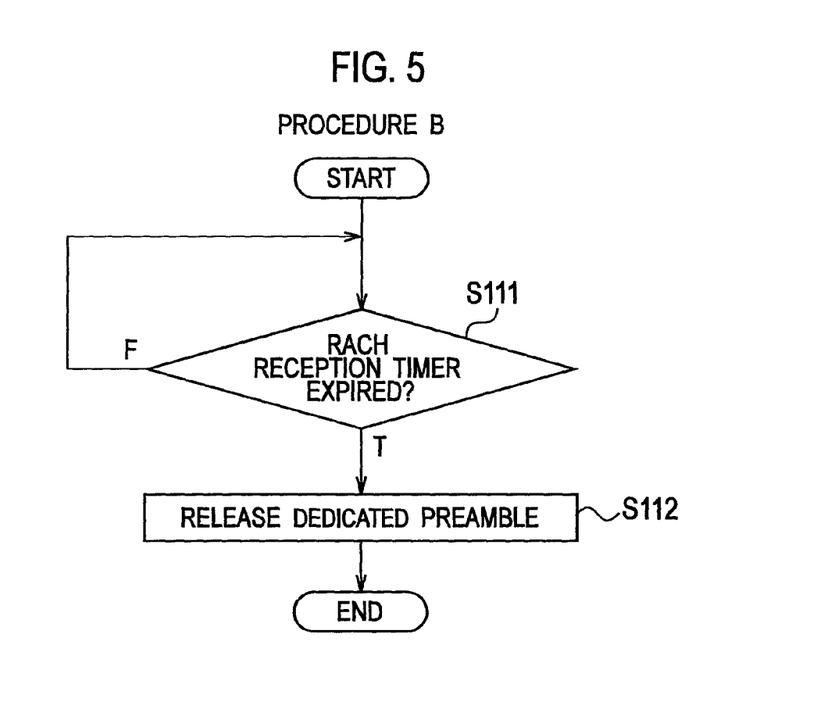
FIG. 5 is a flowchart showing operations in a procedure B by the radio base station according to the first embodiment of the present invention.

As shown in FIG. 5, when the radio base station eNB starts the procedure B, the RACH manager unit 14 determines whether or not the RACH reception timer (L1 retransmission) has expired in Step S111. Here, the RACH reception timer (L1 retransmission) may be defined by time or may be defined by the number of times of retransmission of the dedicated preamble using the asynchronous RACH.

When determining that the RACH reception timer (L1 retransmission) has expired, in Step S112, the RACH manager unit 14 releases the dedicated preamble allocated to the mobile station UE.

Figure 6:
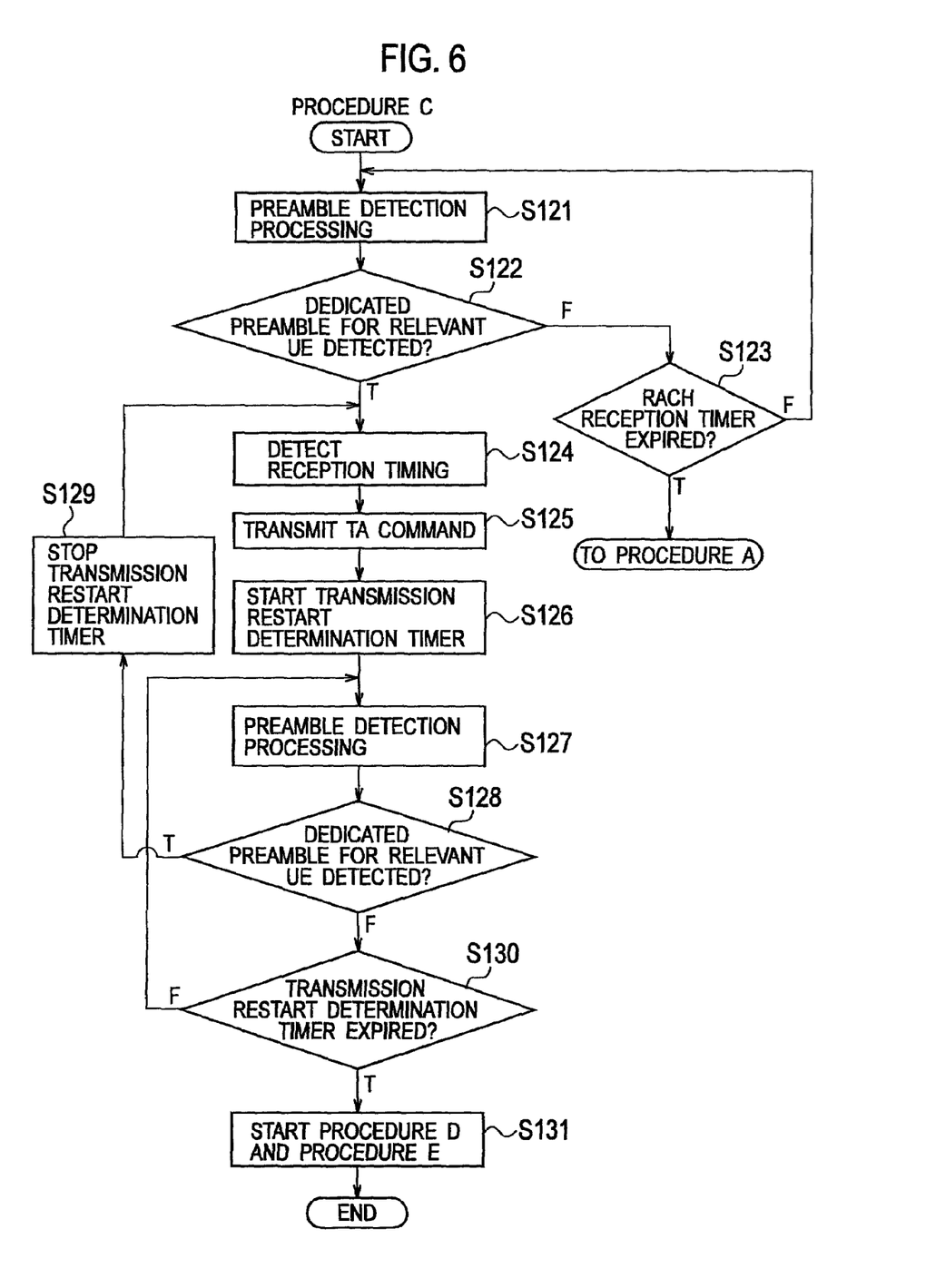
FIG. 6 is a flowchart showing operations in a procedure C by the radio base station according to the first embodiment of the present invention.

As shown in FIG. 6, when the radio base station eNB starts the procedure C, the RACH manager unit 14 performs preamble detection processing in Step S121, and determines whether or not to detect the dedicated preamble for the mobile station UE in Step S122.

When determining that the dedicated preamble for the mobile station UE is not detected, the RACH manager unit 14 determines whether or not the RACH reception timer (L1 retransmission) has expired in Step S123.

The operation returns to Step S121 when the RACH manager unit 14 determines that the RACH reception timer (L1 retransmission) has expired. By contrast, the operation returns to Start of the procedure A, when the RACH manager unit 14 determines that the RACH reception timer (L1 retransmission) has expired.

On the other hand, when the RACH manager unit 14 determines that the dedicated preamble for the mobile station UE is detected, the transmission timing manager unit 15 detects the reception timing of the dedicated preamble in Step S124.

In Step S125, the transmission timing manager unit 15 creates a TA command in response to the reception timing of the dedicated preamble, the MAC-PDU generator unit 16 generates a MAC-PDU containing the created TA command, and the transmitter unit 17 transmits the MAC-PDU by using the downlink data channel.

In Step S126, the scheduler unit 16a starts a transmission restart determination timer. The RACH manager unit 14 performs preamble detection processing in Step S127, and determines whether or not to detect a dedicated preamble for the mobile station UE in Step S128.

When the RACH manager unit 14 determines that the dedicated preamble for the mobile station UE is detected, the scheduler unit 16a stops the transmission restart determination timer in Step S129.

On the other hand, when the RACH manager unit 14 determines that the dedicated preamble for the mobile station UE is not detected, in Step S130, the scheduler unit 16a determines whether or not the transmission restart determination timer has expired.

The radio base station eNB starts a procedure D and a procedure E in Step S131, when the scheduler unit 16a determines that the transmission restart determination timer has expired. By contrast, the operation returns to Step S127, when the scheduler unit 16a determines that the transmission restart determination timer has not expired.

Figure 7:
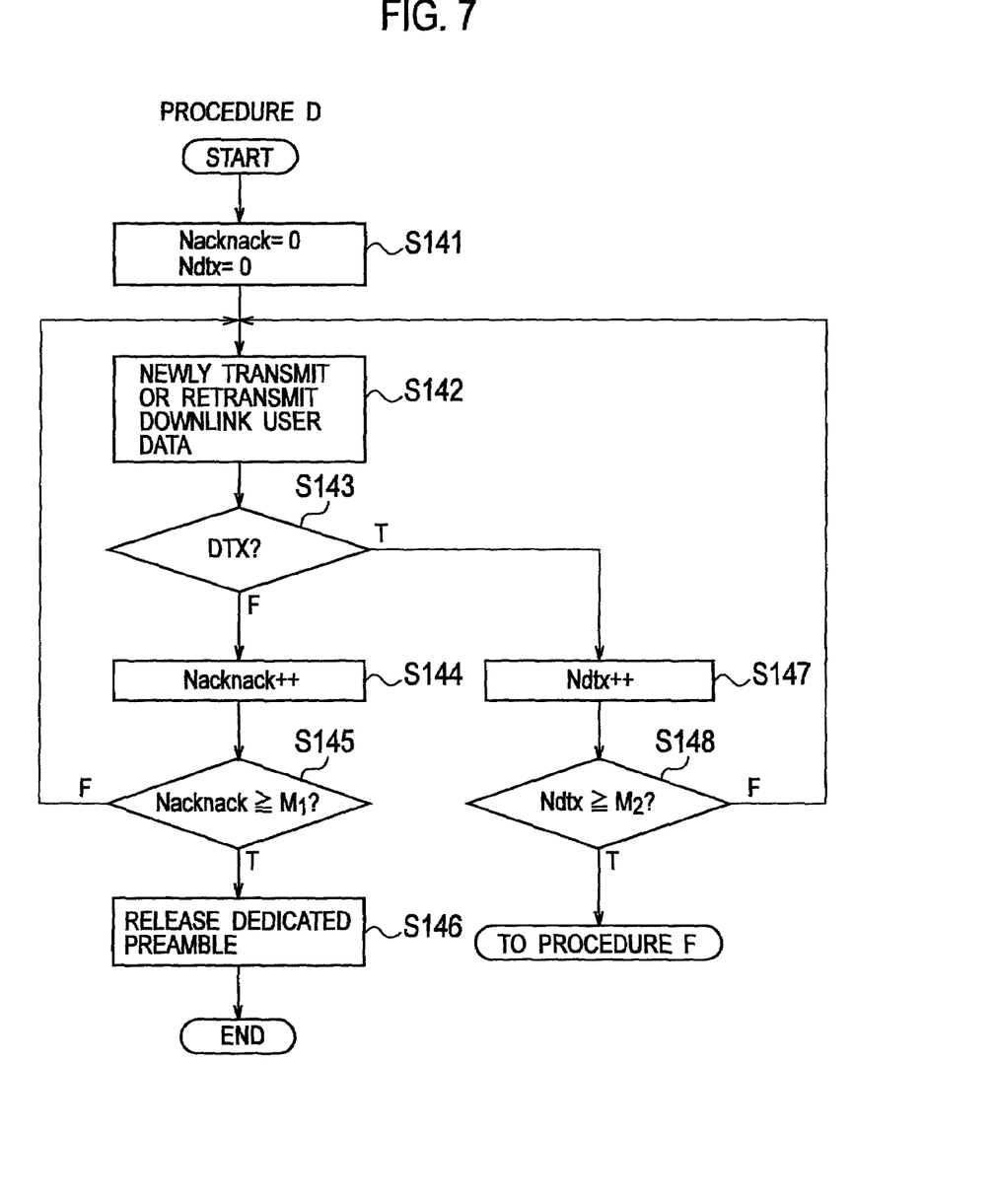
FIG. 7 is a flowchart showing operations in a procedure D by the radio base station according to the first embodiment of the present invention.

As shown in FIG. 7, when the radio base station eNB starts the procedure D, parameters $N_{acknack}$ and $N_{dtx}$ are initialized in Step S141.

In Step S142, the MAC-PDU generator unit 16 generates a MAC-PDU containing downlink user data in the radio subframe to which the transmission opportunity is allocated by the scheduler unit 16a, and the transmitter unit 17 restarts new transmission or retransmission of the MAC-PDU via the downlink data channel.

In Step S143, the HARQ manager unit 13 monitors the transmission acknowledgment information (ACK/NACK) in the HARQ process. When the transmission acknowledgment information (ACK/NACK) in the HARQ process is received, $N_{acknack}$ is incremented by only one in Step S144. When the transmission acknowledgment information (ACK/NACK) in the HARQ process is not received (in the case of being in the DTX state), $N_{dtx}$ is incremented by only one in Step S147.

Here, $N_{acknack}$ may be incremented by only one in Step S144, when the transmission acknowledgment information in the HARQ process is consecutively received, and $N_{dtx}$ may be incremented by only one in Step S147, when the transmission acknowledgment information in the HARQ process is not received consecutively (in the case of being in the DTX state).

In Step S145, a determination is made as to whether or not $N_{acknack}$ is equal to or above a predetermined threshold $M_1$. The RACH manager unit 14 releases the dedicated preamble allocated to the mobile station UE, when $N_{acknack}$ is determined to be equal to or above the predetermined threshold $M_1$. The operation returns to Step S142, when $N_{acknack}$ is determined not to be equal to or above the predetermined threshold $M_1$.

Figure 8:
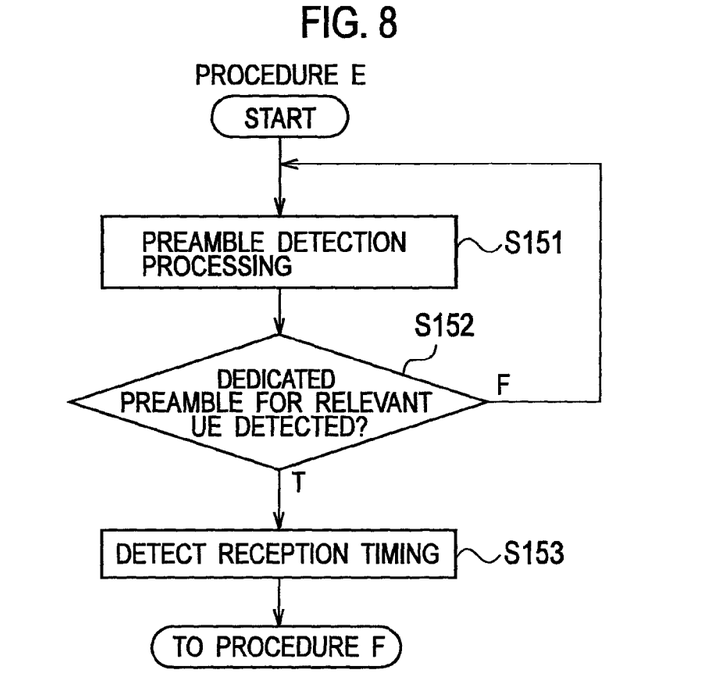
FIG. 8 is a flowchart showing operations in a procedure E by the radio base station according to the first embodiment of the present invention.

Meanwhile, in Step S148, a determination is made as to whether or not $N_{dtx}$ is equal to or above a predetermined threshold $M_2$. The operation proceeds to Start of a procedure F, when $N_{dtx}$ is determined to be equal to or above the predetermined threshold $M_2$. Meanwhile, the operation returns to Step S142, when $N_{dtx}$ is determined not to be equal to or above the predetermined threshold $M_2$. As shown in FIG. 8, when the radio base station eNB starts the procedure E, the RACH manager unit 14 performs preamble detection processing in Step S151, and determines whether or not to detect the dedicated preamble for the mobile station UE in Step S152.

When the RACH manager unit 14 determines that the dedicated preamble for the mobile station UE is detected, the transmission timing manager unit 15 detects the reception timing of the dedicated preamble for the mobile station UE in Step S153. Then, the operation proceeds to Start of the procedure F.

On the other hand, the operation returns to Step S151, when the RACH manager unit 14 determines that the dedicated preamble for the mobile station UE is not detected.

Figure 9:
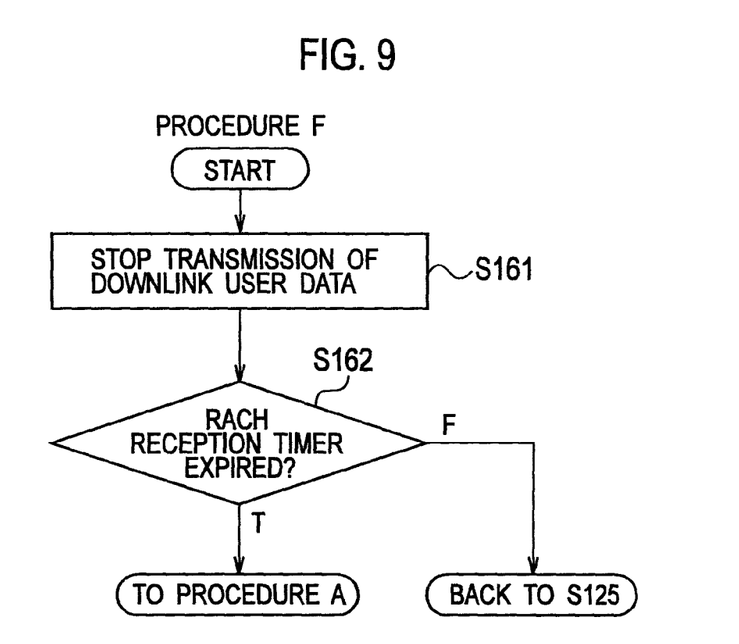
FIG. 9 is a flowchart showing operations in a procedure F by the radio base station according to the first embodiment of the present invention.

As shown in FIG. 9, when the radio base station eNB starts the procedure F, the generation processing of a MAC-PDU containing downlink user data performed by the MAC-PDU generator unit 16 and the transmission processing of the MAC-PDU performed by the transmitter unit 17 are stopped in Step S161.

In Step S161, a determination is made as to whether or not the RACH reception timer has expired. The operation returns to Start of the procedure A, when the RACH reception timer is determined to have expired. By contrast, the operation returns to Step S125 of the procedure C, when the RACH reception timer is determined not to have expired.

Second, operations of the mobile station UE according to this embodiment will be described with reference to FIG. 10 to FIG. 12.

Figure 10:
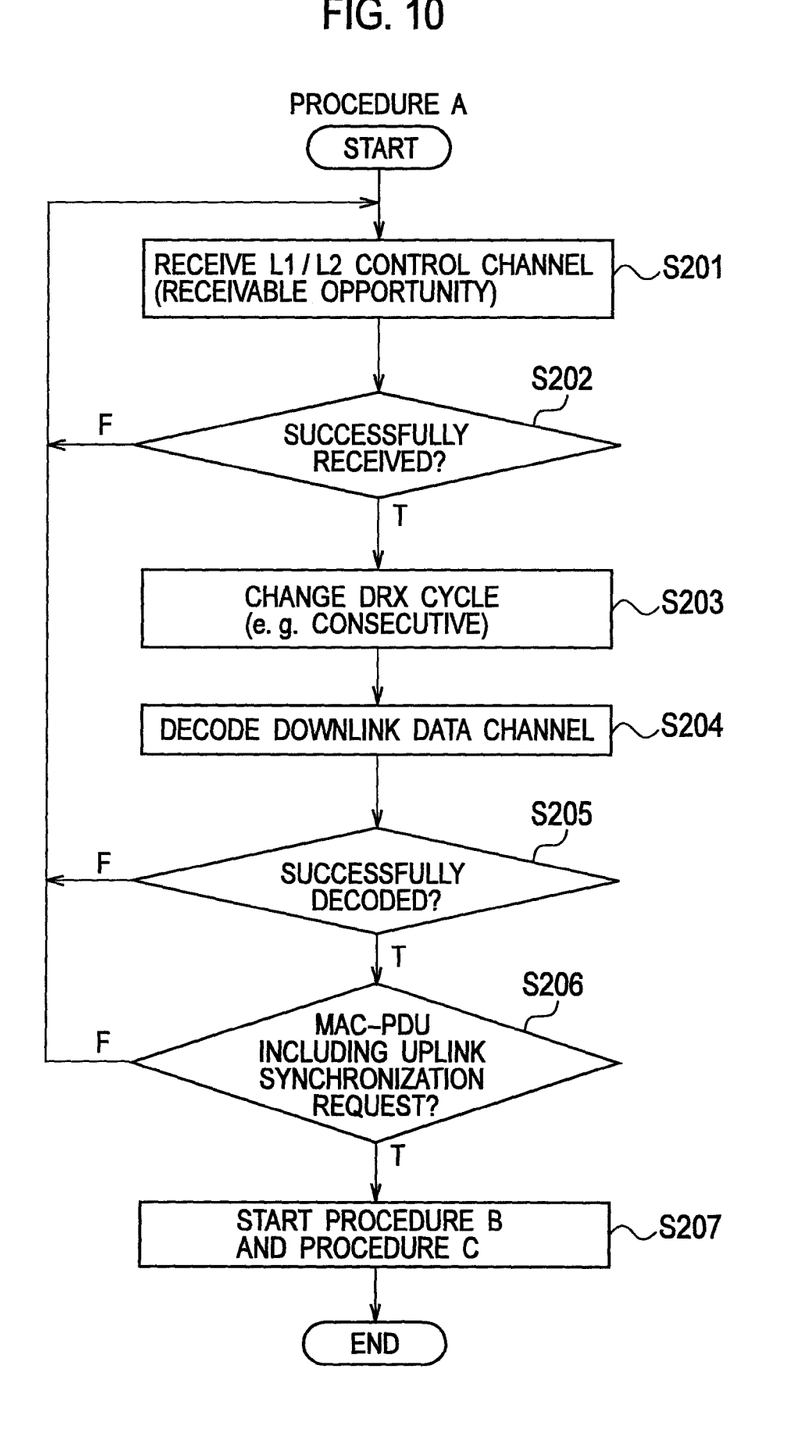
FIG. 10 is a flowchart showing operations in a procedure A by the mobile station according to the first embodiment of the present invention.

As shown in FIG. 10, when the mobile station UE in the DRX state starts the procedure A, the receiver unit 31 receives the L1/L2 control channel at a receivable opportunity (a DRX cycle) of the mobile station UE in Step S201.

When the receiver unit 31 successfully receives the L1/L2 control channel in Step S202, in Step S203, the L1/L2 control information processor unit 32 changes the DRX cycle (changing a reception state of the mobile station UE to a consecutive reception state or shortening the DRX cycle, for example) in accordance with the L1/L2 control information (the radio resource notification control information) transmitted via the L1/L2 control channel.

On the other hand, the operation returns to Step S201, when the receiver unit 31 fails to receive the L1/L2 control channel in Step S202.

In Step S204, the receiver unit 31 decodes the downlink data channel received at the receivable opportunity of the mobile station UE. The operation proceeds to Step S206, when the decoding is successful. By contrast, the operation returns to Step S201, when the decoding is failed (Step S205).

In Step S206, the MAC-PDU analyzer unit 34 determines whether or not the MAC-PDU, which is transmitted via the downlink data channel that is successfully decoded, contains the uplink synchronization request.

When the MAC-PDU analyzer unit 34 determines that the uplink synchronization request is contained, the mobile station UE starts a procedure B and a procedure C in Step S207. By contrast, the operation returns to Step S201, when the MAC-PDU analyzer unit 34 determines that the uplink synchronization request is not contained.

Figure 11:
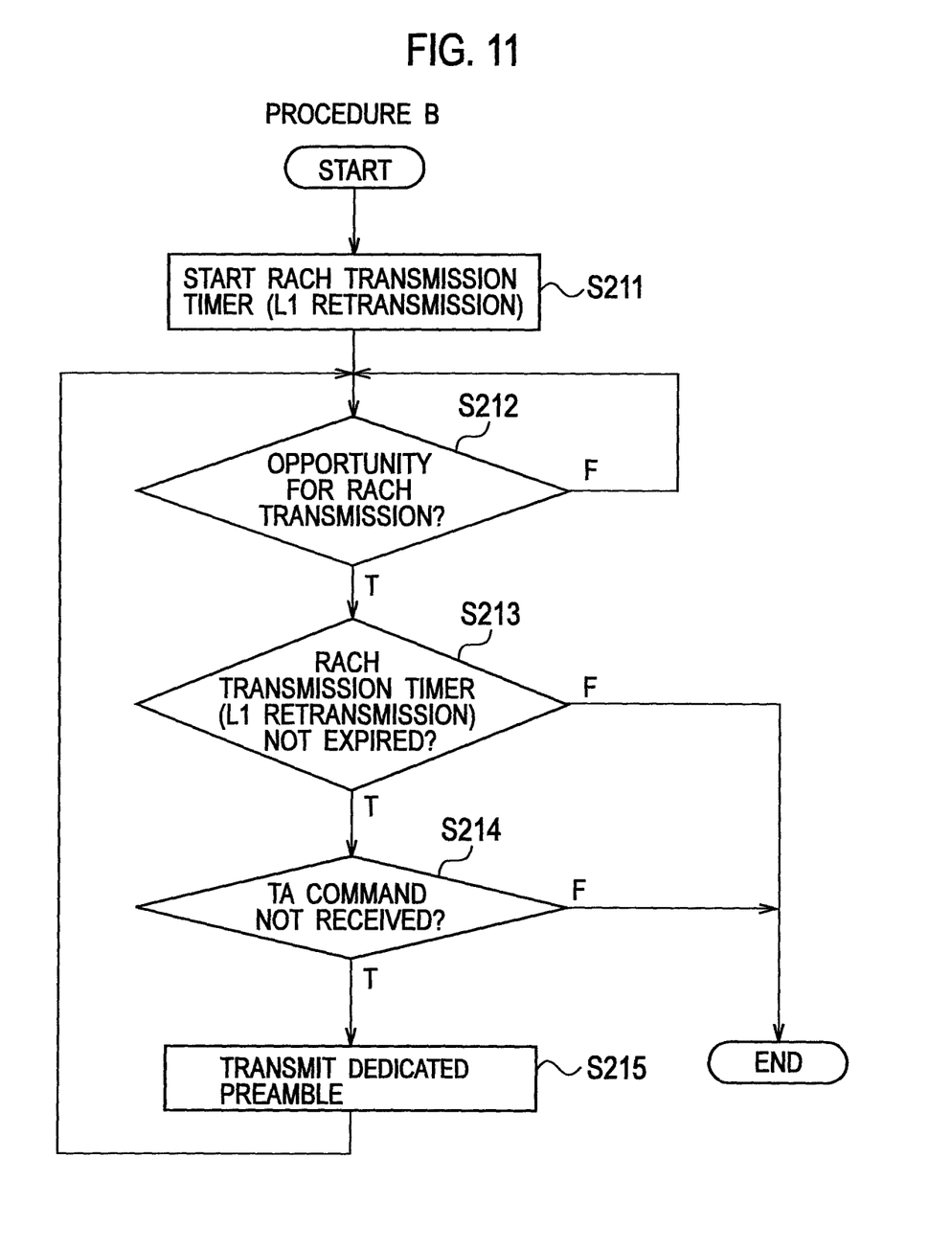
FIG. 11 is a flowchart showing operations in a procedure B by the mobile station according to the first embodiment of the present invention.

As shown in FIG. 11, when the mobile station UE starts the procedure B, a RACH transmission timer (L1 retransmission) is started in Step S211, and the RACH transmission manager unit 36 determines whether or not it is an opportunity for the mobile station UE to transmit the asynchronous RACH in Step S212.

When determining that it is the opportunity, the RACH transmission manager unit 36 determines whether or not the RACH transmission timer (L1 retransmission) has expired in Step S213.

When determining that the RACH transmission timer (L1 retransmission) has not expired, the RACH transmission manager unit 36 determines whether or not the TA command is received in Step S214. On the other hand, the operation is terminated, when the RACH transmission manager unit 36 determines that the RACH transmission timer (L1 retransmission) has expired.

When determining that the TA command is not received in Step S214, the RACH transmission manager unit 36 transmits the dedicated preamble using the asynchronous RACH by way of the transmitter unit 38. On the other hand, the operation is terminated, when the RACH transmission manager unit 36 determines that the TA command is received.

Figure 12:
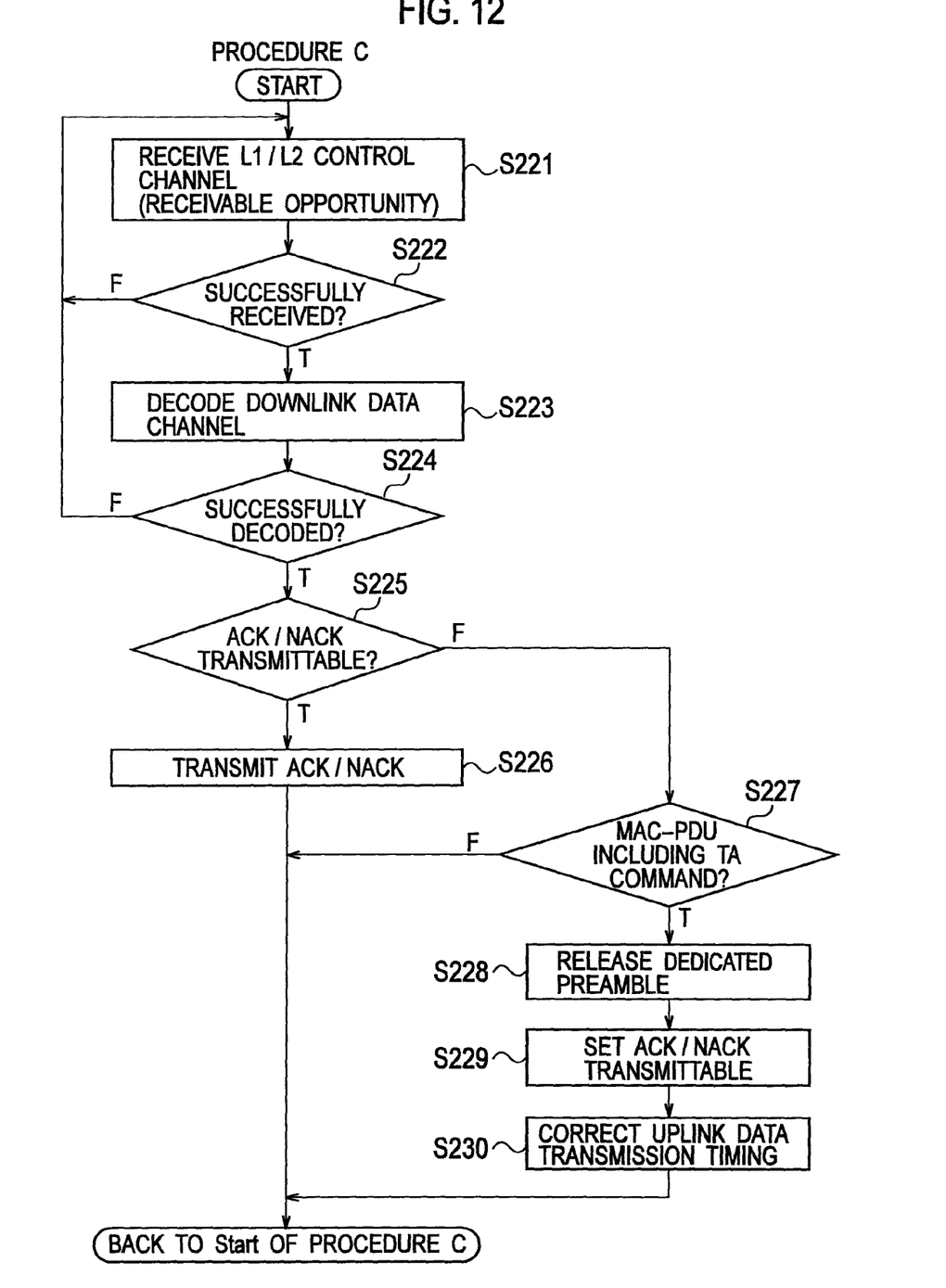
FIG. 12 is a flowchart showing operations in a procedure C by the mobile station according to the first embodiment of the present invention.

As shown in FIG. 12, when the mobile station UE starts the procedure C, the receiver unit 31 receives the L1/L2 control channel at the receivable opportunity (the DRX cycle) of the mobile station UE in Step S221.

When the receiver unit 31 successfully receives the L1/L2 control channel in Step S222, the downlink data channel received at the receivable opportunity of the mobile station UE is decoded in Step S223. The operation proceeds to Step S225, when the decoding is successful, whereas the operation returns to Step S221, when the decoding is failed (Step S224).

On the other hand, the operation returns to Step S221, when the receiver 31 fails to receive the L1/L2 control channel in Step S222.

In Step S225, the HARQ transmission manager unit 35 determines whether or not it is set up so as to allow transmission of the transmission acknowledgment signal (ACK/NACK) in the HARQ process.

When a determination is made that it is set up so as to allow transmission of the transmission acknowledgment signal (ACK/NACK) in the HARQ process, in Step S226, the HARQ transmission manager unit 35 transmits ACK/NACK for the MAC-PDU, which is contained in the downlink data channel having been successfully decoded, by way of the transmitter unit 38.

On the other hand, when a determination is made that it is not set up so as to allow transmission of the transmission acknowledgment signal (ACK/NACK) in the HARQ process, the RACH transmission manager unit 36 determines whether or not the MAC-PDU contained in the downlink data channel successful decoded includes the TA command in Step S227.

When determining that the TA command is included, the RACH transmission manager unit 36 releases the dedicated preamble for the mobile station UE allocated by the radio base station eNB in Step S228. In Step S229, the HARQ transmission manager unit 35 set up so as to allow transmission of the transmission acknowledgment signal (ACK/NACK) in the HARQ process. In Step S230, the transmission timing controller unit 37 corrects the uplink transmission timing in accordance with the received TA command.

Third, with reference to FIG. 13, a description will be given of how the mobile communication system according to this embodiment establishes uplink synchronization when the reception state of the mobile station UE transitions from the DRX state to the continuous reception state.

Figure 13:
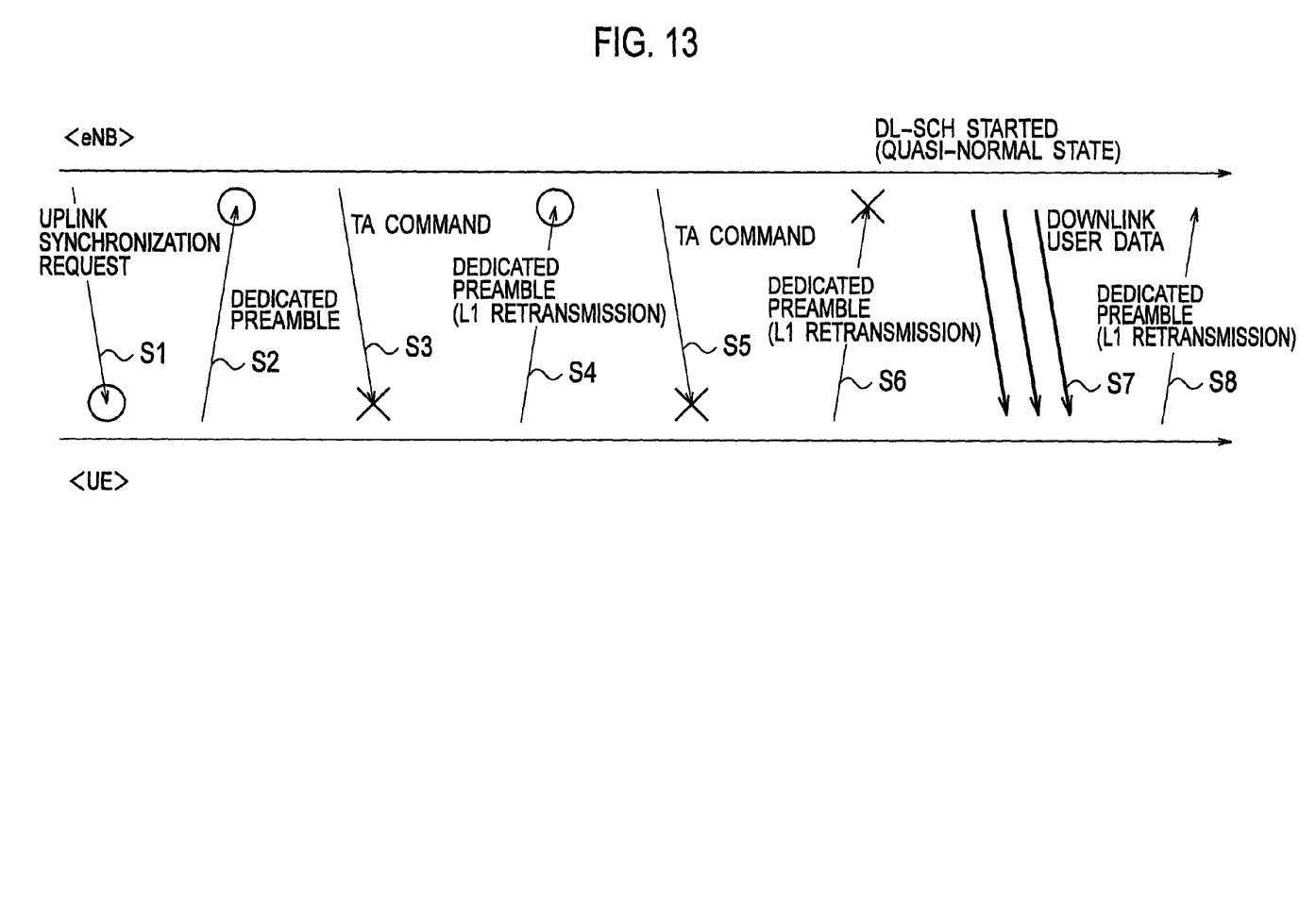
FIG. 13 is a view for explaining a procedure to restart from a DRX state in a mobile communication system according to the first embodiment of the present invention.

As shown in FIG. 13, since uplink synchronization is not established between the radio base station eNB and the mobile station UE, in Step S8, the mobile station UE transmits the dedicated preamble for the mobile station UE by using the asynchronous RACH in response to the MAC-PDU included in the DL-SCH (downlink data channel) transmitted in Step S7, instead of transmitting transmission acknowledgment information (ACK/NACK) in the HARQ process.

(Operation and Effect of Mobile Communication System According to First Embodiment of the Present Invention)

According to the mobile communication system of the first embodiment of the present invention, occurrence of uplink interference due to transmission acknowledgment information (ACK/NACK) in the HARQ process can be prevented when the reception state of the mobile station UE transitions from the "DRX state (discontinuous reception state)" to the continuous reception state.

The present invention has been explained in detail by using the above-described embodiment. However, it is obvious to those skilled in the art that the present invention is not limited to the embodiment described herein. The present invention can be implemented as modified and corrected forms without departing from the spirit and scope of the present invention to be defined by the appended claims. Therefore, it is to be understood that the description herein is for illustrative purposes only and therefore does not intend to limit the present invention whatsoever.

It is to be understood that the entire contents of Japanese Patent Application No. 2007-077980 (filed on Mar. 23, 2007) are incorporated herein by reference.

Industrial Applicability

As described above, the present invention can provide the mobile station, the radio base station and the synchronization establishing method, which are capable of preventing occurrence of uplink interference due to transmission acknowledgment information in the HARQ process in establishment of uplink synchronization. Hence the invention is useful for radio communication such as mobile communication.

The invention claimed is:

1. A mobile station configured to establish synchronization in an uplink, when a reception state is shifted from a discontinuous reception state to a continuous reception state, the mobile station comprising:
   a receiver unit configured to receive a control channel and a downlink data channel;
   a control information processor unit configured to change a discontinuous reception cycle according to radio resource notification control information included in the control channel received in the receiver unit;
   an analyzer unit configured to determine whether or not an uplink synchronization request designating a data series for identifying a mobile station is included in the downlink data channel received in the receiver unit;
   a random access channel transmission manager unit configured to determine whether or not a random access channel transmission timer has expired, when it is determined by the analyzer that the uplink synchronization request is included;
   the random access channel transmission manager unit determining whether or not to transmit a non-synchronization random access channel, when it is determined that the random access channel transmission timer has not expired;
   a transmitter unit configured to transmit the data series for identifying the mobile station by using the non-synchronization random access channel, when it is determined that the random access channel transmission manager unit can transmit the non-synchronization random access channel;
   the random access channel transmission manager unit determining whether or not a command for adjusting a transmission timing in the uplink is included in the downlink channel;
   a transmission timing controller unit configured to establish uplink synchronization by controlling the transmission timing in accordance with the command for adjusting the transmission timing; and
   a Hybrid Automatic Repeat Request (HARQ) transmission manager unit configured to return transmission acknowledgment information for downlink data, when the command for adjusting the transmission timing in the uplink is included,
   wherein the random access channel transmission manager unit transmits the data series for identifying the mobile station using the non-synchronization random access channel, when the command for adjusting the transmission timing is not received for a predetermined time period; and wherein the random access channel transmission manager unit transmits the data series for identifying the mobile station using the non-synchronization random access channel, when the downlink data is received before establishing uplink synchronization.

2. The mobile station according to claim 1, wherein the radio resource is allocated by use of an identifier which individually identifies the mobile station within a cell.

3. The mobile station according to claim 1, wherein the transmission acknowledgment information is any of ACK and NACK in a HARQ process.

4. A synchronization establishing method of establishing uplink synchronization between a radio base station and a mobile station when a reception state is shifted from a discontinuous reception state to a continuous reception state, the synchronization establishing method comprising the steps of:
   allocating, at the radio base station, a radio resource for transmission of a downlink data to the mobile station;
   transmitting, at the radio base station, an uplink synchronization request designating a data series which is allocated to the mobile station and which is used for identifying the mobile station;
   changing, at the mobile station, the discontinuous reception cycle according to radio resource notification control information included in the downlink data received in a receiver unit of the mobile station;
   determining, at the mobile station, whether or not the uplink synchronization request designating a data series for identifying a mobile station is included in the downlink data channel received in the receiver unit of the mobile station;
   determining, at the mobile station, whether or not a random access channel transmission timer has expired, when it is determined by an analyzer that the uplink synchronization request is included;
   determining, at the mobile station, whether or not to transmit a non-synchronization random access channel, when it is determined that the random access channel transmission timer has not expired;
   notifying, from the mobile station to the radio base station, the data series designated by the uplink synchronization request, when successfully receiving the uplink synchronization request;
   determine, at the base station, whether or not to receive the data series from the mobile station;
   detecting, at the base station, a reception timing of the data series;
   generating, at the base station, a command for adjusting a transmission timing in the uplink in response to the reception timing of the data series;
   determining, at the mobile station, whether or not a command for adjusting a transmission timing in the uplink is included in the downlink channel;
   establishing uplink synchronization by controlling the transmission timing in the uplink in accordance with the command for adjusting the transmission timing;
   determining, at the radio base station, that the mobile station has successfully received the uplink synchronization request, and transmitting, from the radio base station to the mobile station, a command for adjusting uplink transmission timing, when the radio base station receives the data series from the mobile station;
   receiving, at the base station, transmission acknowledgment information for the downlink data, when the command for adjusting the transmission timing is received by the mobile station, transmitting the data series for identifying the mobile station using the non-synchronization random access channel, when the command for adjusting the transmission timing is not received for a predetermined time period; and transmitting the data series for identifying the mobile station using the non-synchronization random access channel, when the downlink data is received before establishing uplink synchronization.

5. The synchronization establishing method according to claim 4, wherein the mobile station does not return transmission acknowledgment information for the downlink data until receiving the command after the radio base station allocates the radio resource for transmission of the downlink data to the mobile station.

6. The synchronization establishing method according to claim 4, wherein the data series is a preamble for a random access channel; and when successfully receiving the uplink synchronization request, the mobile station notifies, to the radio base station, the preamble designated by the uplink synchronization request by use of the random access channel.

* * * * *